(12) United States Patent
Ittogi et al.

(10) Patent No.: US 10,482,358 B2
(45) Date of Patent: Nov. 19, 2019

(54) APPARATUS THAT OPERATES WITH UNIT MOUNTED THEREIN AND THE UNIT

(71) Applicant: CANON KABUSHIKI KAISHA, Tokyo (JP)

(72) Inventors: Hirotaka Ittogi, Yokohama (JP); Kenjiro Hori, Tokorozawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 251 days.

(21) Appl. No.: 15/461,992

(22) Filed: Mar. 17, 2017

(65) Prior Publication Data

US 2017/0293829 A1  Oct. 12, 2017

(30) Foreign Application Priority Data

Apr. 7, 2016 (JP) ................. 2016-077577

(51) Int. Cl.
*G06F 21/44* (2013.01)
*H04L 29/06* (2006.01)
(Continued)

(52) U.S. Cl.
CPC ............. *G06K 15/14* (2013.01); *G06F 21/44* (2013.01); *G06F 21/608* (2013.01); *G06K 15/407* (2013.01); *G06K 15/4025* (2013.01); *G06K 15/4065* (2013.01); *H04L 9/14* (2013.01); *H04L 9/30* (2013.01); *H04L 9/3247* (2013.01)

(58) Field of Classification Search
CPC . H04L 63/04; H04L 9/30; H04L 63/12; G06F 21/60
See application file for complete search history.

(56) References Cited

U.S. PATENT DOCUMENTS 7,650,499 B2  1/2010  Ittogi
9,407,439 B2  8/2016  Ittogi
(Continued)

FOREIGN PATENT DOCUMENTS

JP  2005167977 A  6/2005

OTHER PUBLICATIONS

ISO/IEC 9796-2, Information technology—Security techniques—Digital signature schemes giving message recovery, Part 2: Integer factorization based mechanisms.
(Continued)

*Primary Examiner* — Izunna Okeke
(74) *Attorney, Agent, or Firm* — Venable LLP

(57) ABSTRACT

An apparatus that operates with a detachable unit mounted therein, includes: a storage unit configured to store a public key; and a verification unit configured to verify data held by the mounted unit, based on the public key. The data includes attribute information indicating an attribute of the unit, and authentication information generated from target information including the attribute information with a secret key paired with the public key and from which the target information is restorable, and the verification unit is further configured to detect an anomaly in the attribute information or the authentication information included in the data, by determining whether the attribute information included in the target information restored from the authentication information using the public key matches the attribute information included in the data.

10 Claims, 6 Drawing Sheets

(51) Int. Cl.
*G06K 15/14* (2006.01)
*G06F 21/60* (2013.01)
*G06K 15/00* (2006.01)
*H04L 9/14* (2006.01)
*H04L 9/30* (2006.01)
*H04L 9/32* (2006.01)

(56) References Cited

U.S. PATENT DOCUMENTS

2005/0252963 A1* 11/2005 Adams ............... G06F 12/1458
235/382
2006/0210284 A1* 9/2006 Mine ..................... B41J 11/009
399/8

OTHER PUBLICATIONS

ISO/IEC 9797-1, Information technology—Security techniques—Message AUthentication Codes (MACs), Part 1: Mechanisms using a block cipher.

\* cited by examiner

F I G. 6
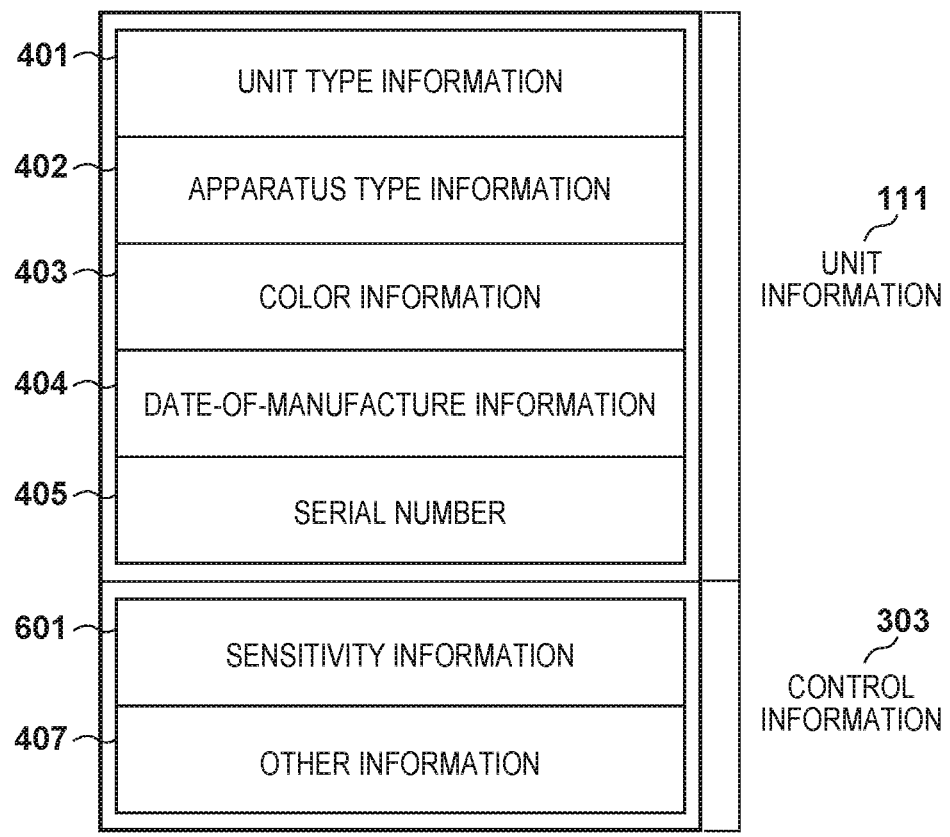

APPARATUS THAT OPERATES WITH UNIT MOUNTED THEREIN AND THE UNIT

BACKGROUND OF THE INVENTION

Field of the Invention

The present invention relates to an apparatus that operates with a unit mounted therein, and more particularly to an apparatus that verifies the validity of the unit by verifying data held by the unit.

Description of the Related Art

Image forming apparatuses operate with external units that are detachable from the main body of the image forming apparatus, such as process cartridges or other replaceable units, mounted therein. Some of these external units are provided with a memory that holds identification information for identifying the external unit and control information that controls the operations of the image forming apparatus when the external unit is mounted. Here, the memory is an electronic device, and it is foreseen that invalid control information will be written thereto due to communication errors and the like that occur when the memory is written. When an external unit to which invalid control information has been written is mounted in the main body of an image forming apparatus and used, there is a risk of the image forming apparatus being adversely affected.

Authentication technologies are utilized in order to distinguish the validity of control information. Authentication technologies include message authentication code technologies based on shared key encryption and digital certificate technologies based on public key encryption. As a message authentication code technology, for example, the technology described in ISO 9797-1 is used. Also, ISO 9796-2 discloses a configuration that generates signature data using a secret key, and performs authentication using a public key that is paired with the secret key. Also, Japanese Patent Laid-Open No. 2005-167977 discloses a configuration for verifying the validity of products.

When an external unit is mounted, it is sought to quickly detect whether the external unit has been erroneously inserted. It is also necessary to verify whether information in the memory of the mounted external unit is valid. In other words, it is necessary to verify whether the mounted external unit is valid. Here, an external unit being valid means that the external unit is a genuine product and has not been erroneously inserted.

SUMMARY OF THE INVENTION

According to an aspect of the present invention, an apparatus that operates with a detachable unit mounted therein, includes: a storage unit configured to store a public key; and a verification unit configured to verify data held by the mounted unit, based on the public key. The data includes attribute information indicating an attribute of the unit, and authentication information generated from target information including the attribute information with a secret key paired with the public key and from which the target information is restorable, and the verification unit is further configured to detect an anomaly in the attribute information or the authentication information included in the data, by determining whether the attribute information included in the target information restored from the authentication information using the public key matches the attribute information included in the data.

Further features of the present invention will become apparent from the following description of exemplary embodiments with reference to the attached drawings.

BRIEF DESCRIPTION OF THE DRAWINGS

FIG. 6 is a diagram showing unit information and control information according to one embodiment.

DESCRIPTION OF THE EMBODIMENTS

Illustrative embodiments of the present invention will be described below with reference to the drawings. Note that, in the following embodiments, the apparatus that operates with a unit mounted therein is an image forming apparatus. However, the following embodiments are illustrative and do not limit the present invention to the contents of the embodiments. Also, in the following diagrams, constituent elements that are not required in the description of the embodiments are omitted from the diagrams.

First Embodiment

Figure 2:
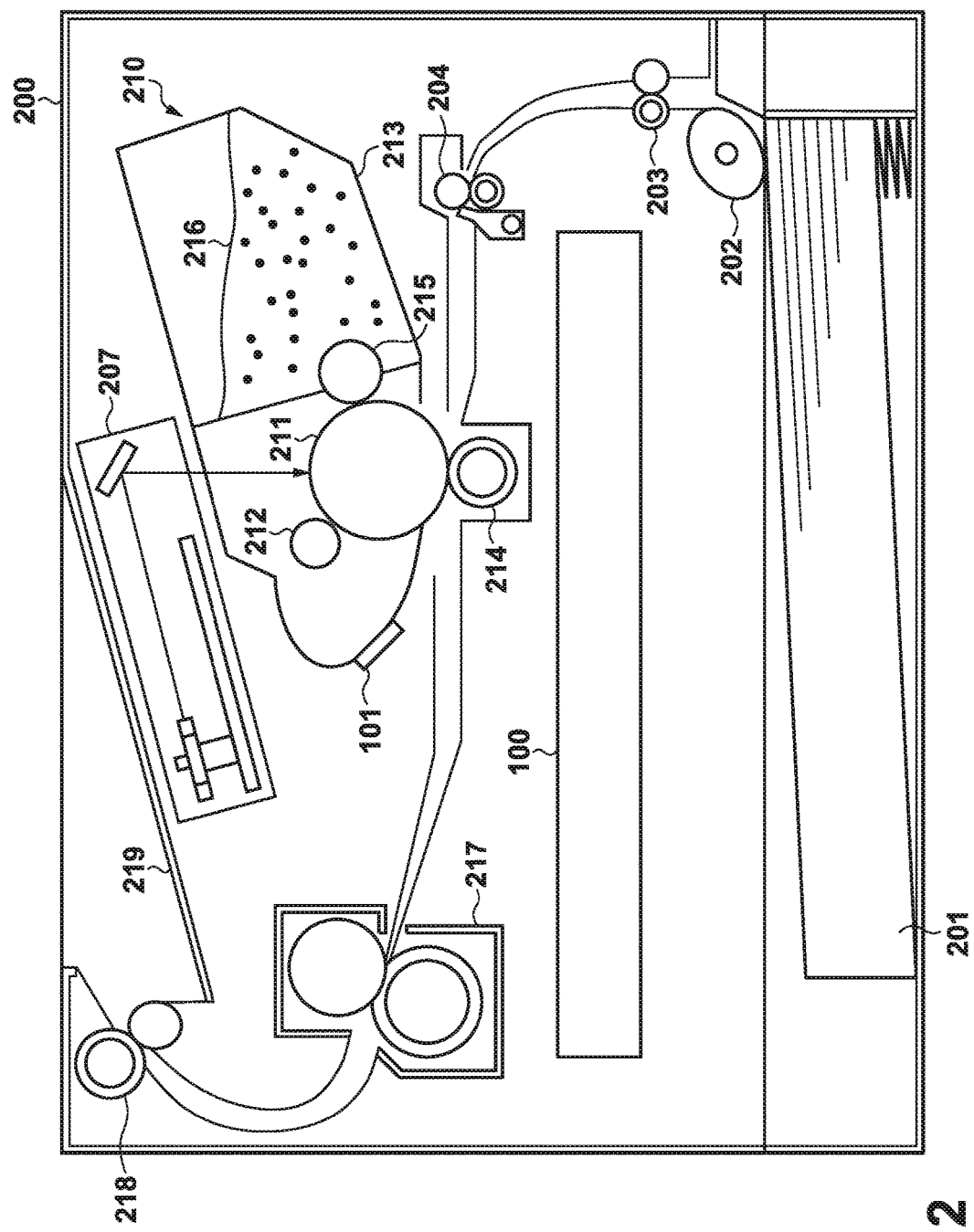
FIG. 2 is a configuration diagram of an image forming apparatus according to one embodiment.

FIG. 2 is a schematic configuration diagram of an image forming apparatus 200 according to the present embodiment. At the time of image formation, a charging roller 212 charges the surface of a photosensitive member 211 that is rotationally driven to a uniform potential. An exposure unit 207 exposes the charged photosensitive member 211 to form an electrostatic latent image. A developing unit 213 has toner 216, which is a developing material, and adheres the toner 216 to the electrostatic latent image on the photosensitive member 211 using a developing bias that is output by the developing roller 215. A toner image is thereby formed on the photosensitive member 211. Meanwhile, recording material housed in a sheet feeding cassette 201 is picked up by a sheet feeding roller 202, and conveyed by a pair of rollers 203 and 204 to a nip region between a transfer roller 214 and the photosensitive member 211. The transfer roller 214 outputs a transfer bias and transfers the toner image on the photosensitive member 211 to the recording material. The recording material to which the toner image has been transferred is thereafter conveyed to a fixing unit 217. The fixing unit 217 applies heat and pressure to the recording material to fix the toner image to the recording material. The recording material to which the toner image has been fixed is thereafter discharged to a sheet discharge tray 219 by a sheet discharge roller 218.

In the present embodiment, the photosensitive member 211, the charging roller 212 and the developing unit 213 are configured as a process cartridge 210, which is a unit that is detachable from the main body of the image forming apparatus (hereinafter, simply referred to as the cartridge 210). In the present embodiment, the cartridge 210 has a tag IC 101 that includes a memory IC. The tag IC 101 is configured to be communicable with a control unit 100 that performs overall control of the image forming apparatus 200. Note that the image forming apparatus in FIG. 1 has one cartridge 210, or in other words, is a monochrome image forming apparatus, but may be a color image forming apparatus that mounts a plurality of cartridges 210 each having toner of a different color.

Figure 1:
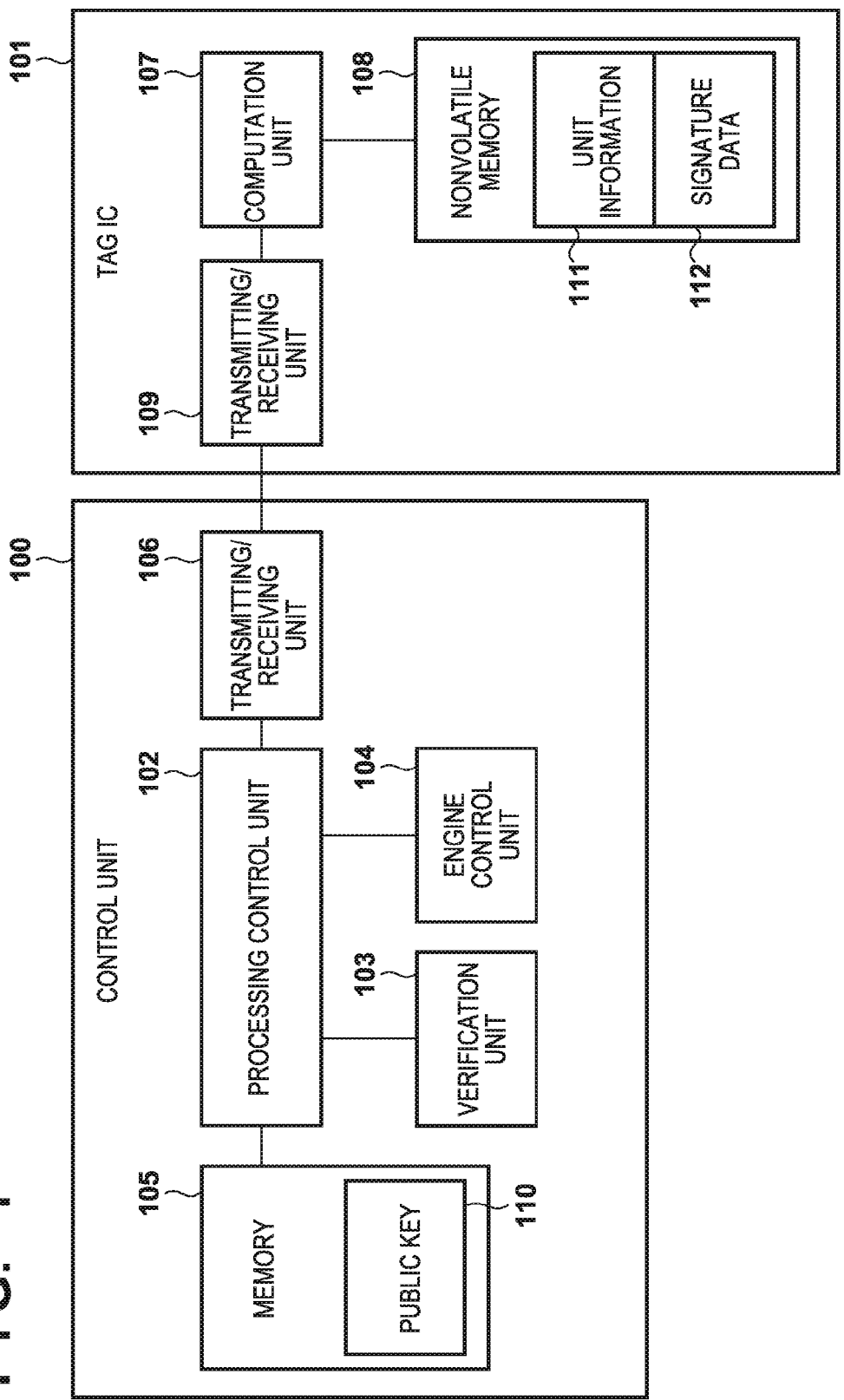
FIG. 1 is a configuration diagram of a control unit and a tag IC according to one embodiment.

FIG. 1 shows the configuration of the tag IC 101 and the control unit 100 according to the present embodiment. As shown in FIG. 1, the control unit 100 and the tag IC 101 communicate with each other using transmitting/receiving units 106 and 109. A computation unit 107 of the tag IC 101 processes received data. A nonvolatile memory 108 stores data including unit information 111 of the cartridge 210 and signature data 112.

Figure 4:
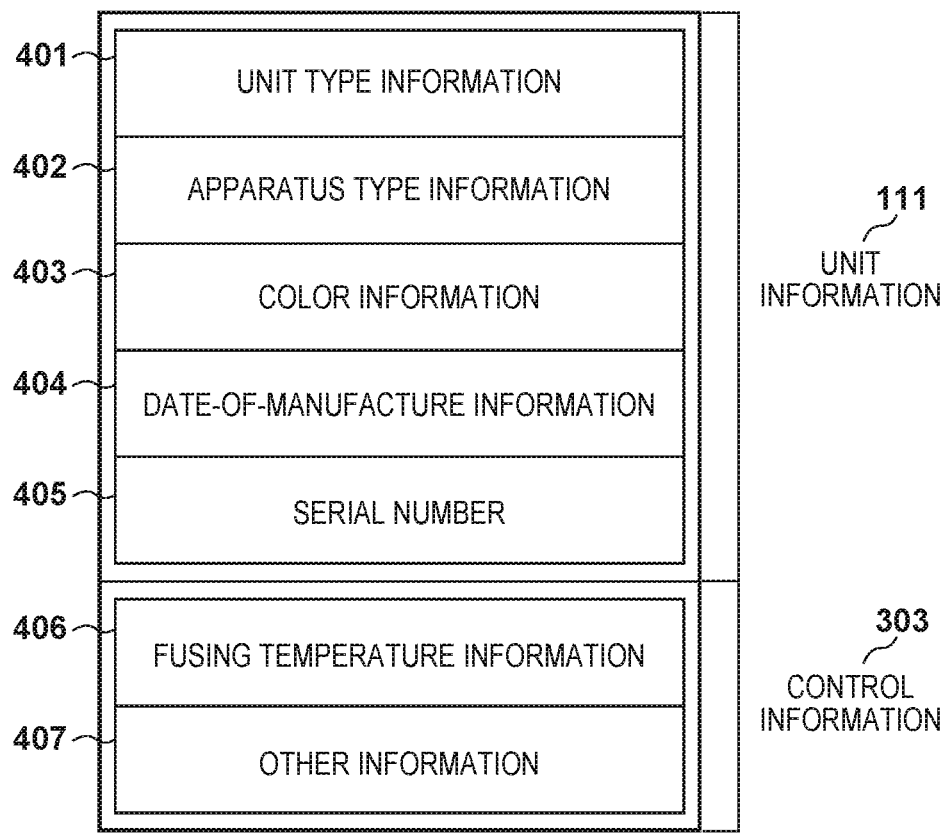
FIG. 4 is a diagram showing unit information and control information according to one embodiment.

The unit information 111 is attribute information indicating an attribute of the unit, and, in this example, includes the information shown in FIG. 4. Specifically, the unit information includes unit type information 401 indicating the type of unit, and apparatus type information 402 indicating the type of image forming apparatus that the unit is compatible with. Furthermore, the unit information 111 includes color information 403 indicating the color of the toner 216 contained in the unit, date-of-manufacture information 404 indicating the date of manufacture of the cartridge 210, and a serial number 405 of the cartridge 210. The signature data 112 in FIG. 1 is authentication information on the data stored in the nonvolatile memory 108. The signature data 112 is data obtained by performing signature processing on target information with a secret key corresponding to a public key 110 that is held in a memory 105 shown in FIG. 1, the target information being all of the unit information 111 and control information 303 shown in FIG. 4. The control information 303, as is shown in FIG. 4, includes, for example, fusing temperature information 406 indicating the fusing temperature of the toner 216 contained in the cartridge 210, and other information 407 for correcting control of the image forming apparatus 200 depending on characteristics unique to the cartridge 210. Returning to FIG. 1, a processing control unit 102 decides processing by the image forming apparatus 200, and an engine control unit 104 controls the members/units in FIG. 2 based on the processing decided by the processing control unit 102 to perform image formation. A verification unit 103 verifies the validity of the cartridge 210 based on the data that is stored in the nonvolatile memory 108 of the tag IC 101. The memory 105, which is a storage unit, holds the public key 110.

Figure 3:
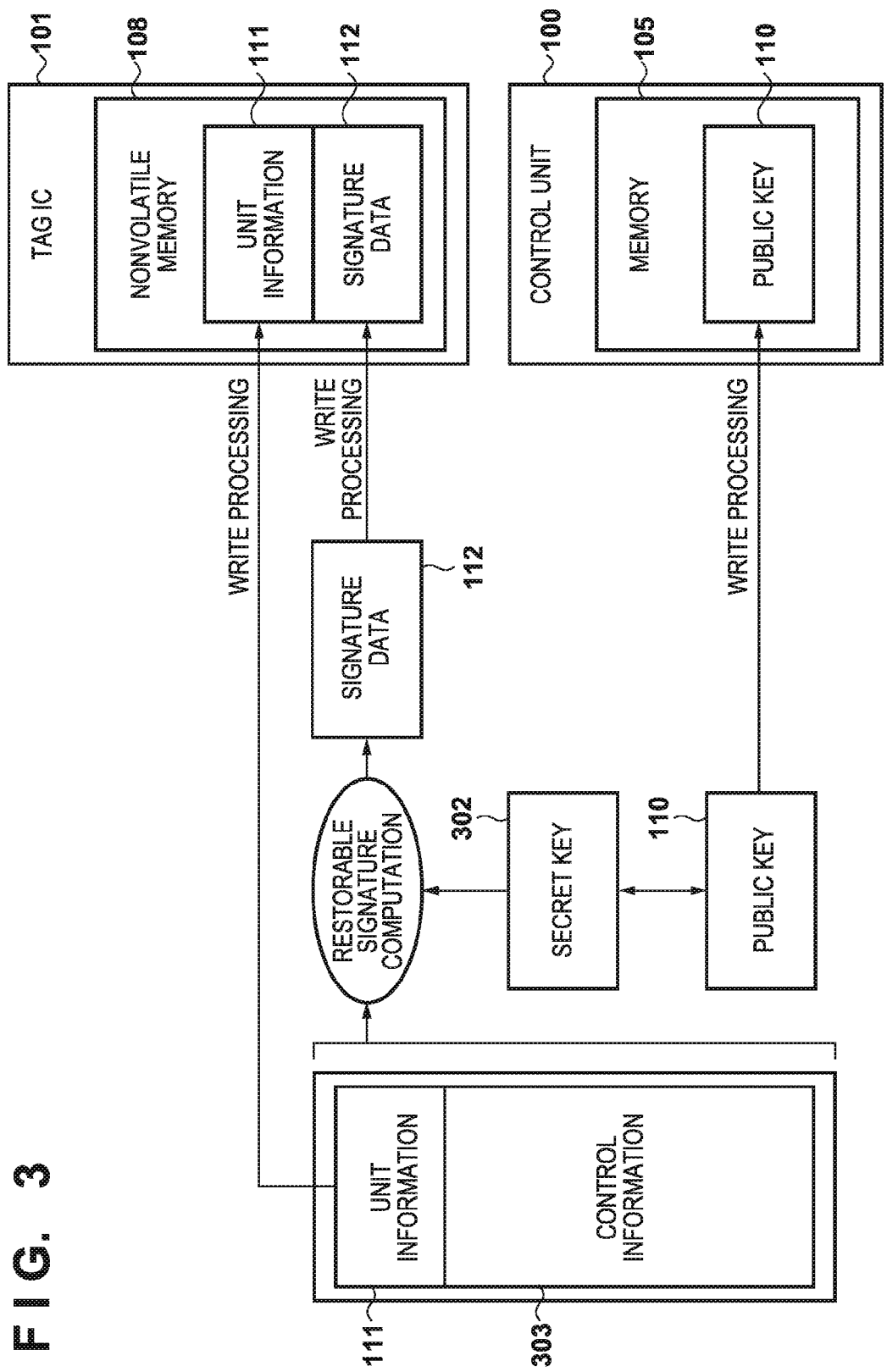
FIG. 3 is an illustrative diagram of signature data generation according to one embodiment.

FIG. 3 is an illustrative diagram of a method of generating the abovementioned signature data 112. A secret key 302 is an encryption key paired with the public key 110 in a public key encryption system. Note that this public key 110 is stored in the memory 105 of the control unit 100. The signature data 112 is generated by performing a restorable signature computation using the secret key 302 on target information including the unit information 111 and the control information 303. As the restorable signature computation, a method described in ISO 9796-2, for example, can be used, although other restorable signature computations may also be used. This signature data 112 and the unit information 111 are stored in the nonvolatile memory 108.

Figure 5:
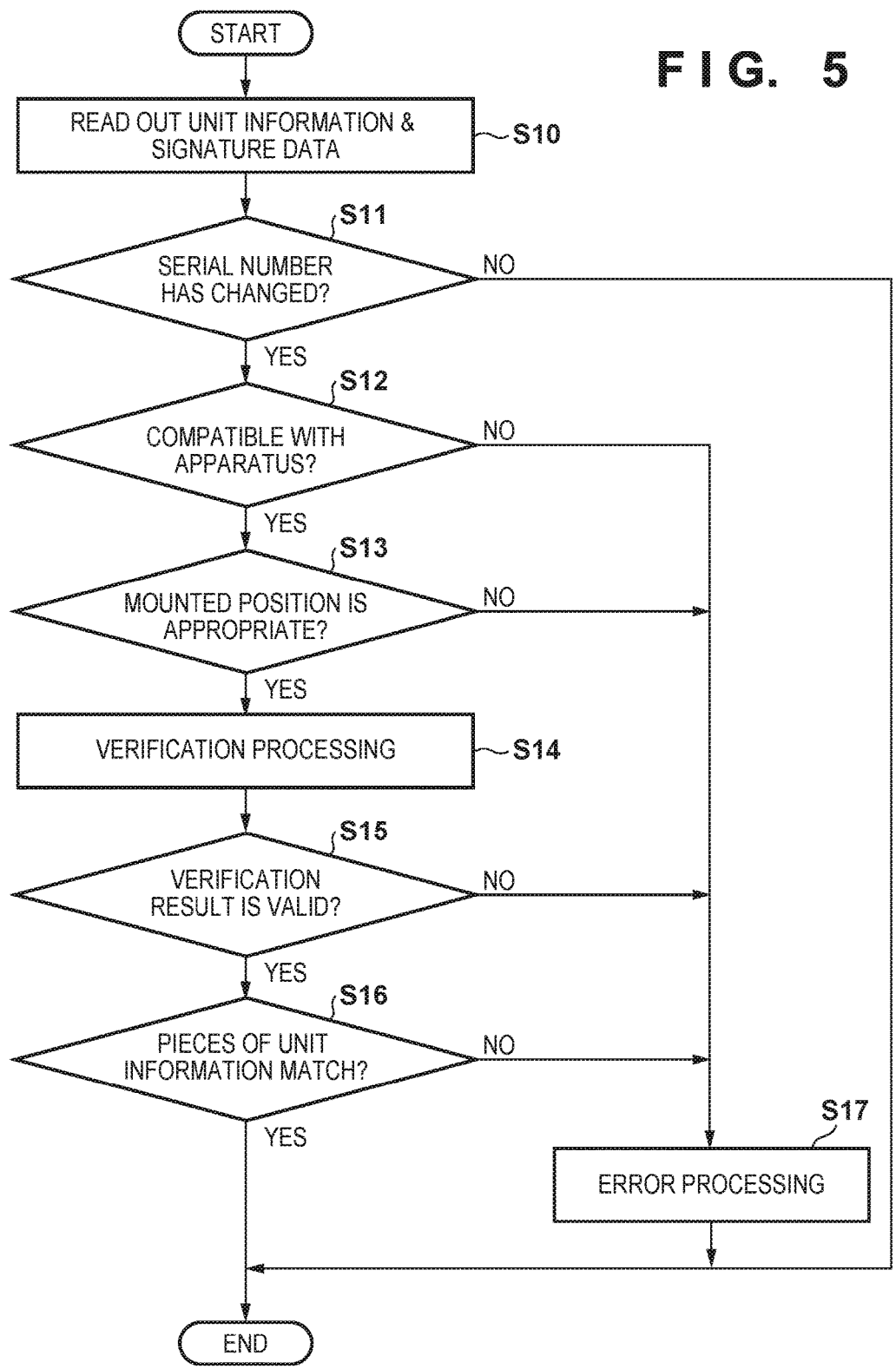
FIG. 5 is a flowchart of processing by the control unit according to one embodiment.

FIG. 5 is a flowchart of verification processing according to the present embodiment. The processing of FIG. 5 is started in response to, for example, a door for replacing the cartridge 210 being opened and thereafter being shut. Note that it is assumed that the unit information 111 stored in the tag IC 101 of the cartridge 210 that was mounted before the door was opened is held in the memory 105, for example. The processing control unit 102, at step S10, reads out the unit information 111 and signature data 112 stored in the tag IC 101. The processing control unit 102 then determines at step S11 whether the serial number 405 of the read unit information 111 matches the serial number that is stored in the memory 105. The processing control unit 102 determines that the cartridge 210 has not been replaced when the serial numbers match, and ends the processing. On the other hand, when the serial numbers do not match, the processing control unit 102 determines that the cartridge 210 has been replaced and proceeds to step S12. In step S12, the processing control unit 102 determines whether the cartridge 210 is compatible with the image forming apparatus 200, based on the apparatus type information 402. In the case where the cartridge 210 is not compatible, the processing control unit 102 performs error processing at step S17, and ends the processing. The error processing in this case involves, for example, displaying to the user that the cartridge 210 that is mounted is not compatible with the image forming apparatus 200.

When the cartridge 210 is compatible with the image forming apparatus 200, the processing control unit 102, at step S13, determines whether the mounted position of the cartridge 210 is appropriate based on the color information 403. Note that this processing is performed in the case where the image forming apparatus 200 is a color image formation apparatus, and in the case of a monochrome image forming apparatus, a configuration that omits step S13 can be adopted. If the cartridge 210 is not mounted in the correct position, the processing control unit 102 performs error processing at step S17 and ends the processing. The error processing in this case involves, for example, displaying to the user that the cartridge 210 is mounted in the wrong position.

If the cartridge 210 is mounted in the correct position, the processing control unit 102, at step S14, causes the verification unit 103 to verify the signature data 112, and, at step S15, acquires a verification result as to whether the signature data 112 is valid from the verification unit 103. Note that the verification method executed by the verification unit 103 is based on the restorable signature computation that is being used. For example, according to the restorable signature computation described in ISO 9796-2, it is verified that target information to be restored is not invalid and was generated by an entity that has the secret key 302, by decrypting the signature data 112 with the public key 110. In other words, the validity of the signature data 112 is determined. If the verification result indicates that the signature data 112 is not valid, the processing control unit 102 performs error processing at step S17 and ends the processing. The error processing in this case involves, for example, displaying to the user that the cartridge 210 is invalid. On the other hand, when the verification result indicates that the signature data 112 is valid, the processing control unit 102 receives, from the verification unit 103, the unit information 111 and the control information 303 restored from the signature data 112. At step S16, the processing control unit 102 then determines whether the unit information 111 restored from the signature data 112 matches the unit information 111 read from the tag IC 101 at step S10. When the two pieces of unit information do not match, the processing control unit 102 performs error processing at step S17 and ends the processing. The two pieces of unit information not matching means that the unit information 111 or the signature data 112 is anomalous. Accordingly, the error processing in this case involves, for example, displaying to the user that the cartridge 210 is invalid. On the other hand, when the two pieces of unit information match, the processing control unit 102 controls subsequent image formation, based on the control information 303 restored from the signature data 112. For example, the processing control unit 102 sets the control temperature of the fixing unit 217, based on the fusing temperature information 406 shown in FIG. 4. Fixing processing at an optimal temperature for the components of the toner 216 that is stored in the cartridge 210 can thereby be realized.

Note that a configuration can be adopted such that when the error processing of step S17 is performed, for example, the control unit 100 displays an error to the user and stops operation of the image forming apparatus. More specifically, a configuration can be adopted that stops the image formation operation. Alternatively, a configuration can also be adopted such that when the error processing of step S17 is performed, the control unit 100 controls the image forming apparatus 200 in accordance with a predetermined initial setting.

As abovementioned, in the present embodiment, the unit information 111 and the signature data 112 are stored in the tag IC 101 of a replaceable unit. The unit information 111 is information indicating an attribute of the unit, and is stored in plain text. Accordingly, the image forming apparatus is first able to quickly detect whether the unit is compatible with the image forming apparatus and whether the mounted position is correct, based on the unit information 111. In other words, the validity of the mounted unit can be quickly determined. Also, the signature data 112 is generated by a restorable signature computation, and it is possible to authenticate the validity of the contents thereof from the signature data 112, and to restore the unit information 111 and the control information 303 from the signature data 112. In the present embodiment, the unit information 111 restored from this signature data 112 is compared with the unit information 111 stored in plain text. For example, in the case where the unit information 111 stored in plain text is changed, the two pieces of unit information will not match. The two pieces of unit information will also not match, in the case where the signature data 112 is replaced with the signature data 112 of another unit generated with the same encryption key. This is because at least the serial number 405 will differ in the signature data 112 of the other unit. The date-of-manufacture information 404 will also differ in many cases. Accordingly, the present embodiment enables verification of the cartridge 210 to be correctly performed, even if the signature data 112 of the other unit is leaked and copied to an imitation product.

Note that, in the above embodiment, the control information 303 had fusing temperature information 406 and other information 407. However, the present invention is not limited to such a configuration, and, for example, sensitivity information 601 indicating the sensitivity of the photosensitive member 211 can be included as the control information 303, instead of the fusing temperature information 406 or in addition to the fusing temperature information 406, as shown in FIG. 6. With the photosensitive member 211 that is included in the cartridge 210, differences in sensitivity exist between individual photosensitive members. Accordingly, in order to maintain a uniform image density, it is necessary to set an optimal amount of laser light for every cartridge 210. The emission intensity of the laser when exposing the photosensitive member 211 can be controlled, by using the control information 303 in FIG. 6. Note that the above information that is included in the control information 303 is illustrative, and may be information relating to other controls.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-077577, filed on Apr. 7, 2016, which is hereby incorporated by reference herein in its entirety.

What is claimed is:

1. An apparatus that operates with a detachable unit mounted therein, the detachable unit including a memory that stores data, comprising:
   a storage unit configured to store a public key; and
   a processor configured to control operation of the apparatus based on the data stored in the memory,
   wherein the data includes attribute information indicating an attribute of the detachable unit, and authentication information generated from target information including the attribute information with a secret key paired with the public key and from which the target information is restorable, and
   wherein the processor is further configured to:
      read out the authentication information and the attribute information from the memory;
      decode the authentication information using the public key to obtain restored attribute information;
      compare the restored attribute information to the attribute information; and
      display an anomaly if the restored attribute information does not match the attribute information.

2. The apparatus according to claim 1,
   wherein the target information includes control information that controls operation of the apparatus, and
   the processor is further configured to control operation of the apparatus if the restored attribute information matches the attribute information.

3. The apparatus according to claim 2,
   wherein, the processor is further configured to stop operation of the apparatus or control the apparatus in accordance with a predetermined initial setting if the restored attribute information does not match the attribute information.

4. The apparatus according to claim 1,
wherein the processor is further configured to determine whether the detachable unit is compatible with the apparatus, based on the attribute information included in the data.

5. The apparatus according to claim 4,
wherein the attribute information included in the data includes information about an apparatus in which the detachable unit is to be mounted, and
the processor is further configured to determine whether the detachable unit is compatible with the apparatus, based on the information about the apparatus in which the detachable unit is to be mounted.

6. The apparatus according to claim 4,
wherein the processor is further configured to determine whether a mounted position of the detachable unit is appropriate, based on the attribute information included in the data.

7. The apparatus according to claim 4, wherein the processor is further configured, when determining that the detachable unit is not compatible with the apparatus, to stop operation of the apparatus or control the apparatus in accordance with a predetermined initial setting.

8. The apparatus according to claim 1,
wherein the apparatus is an image forming apparatus,
the detachable unit includes a photosensitive member and a developing material, and
the target information includes information relating to a sensitivity of the photosensitive member or a fusing temperature of the developing material.

9. An apparatus that operates with a detachable unit mounted therein, the detachable unit including a memory that stores data, comprising:

a storage unit configured to store a public key; and
a processor configured to control operation of the apparatus based on the data stored in the memory,
wherein the data includes attribute information indicating an attribute of the detachable unit and authentication information generated from target information including the attribute information with a secret key paired with the public key and from which the target information is restorable, and
wherein the processor is further configured to:
read out the authentication information and the attribute information from the memory;
determine whether the detachable unit is compatible with the apparatus based on the attribute information;
decode the authentication information using the public key to obtain restored attribute information if the processor determines that the detachable unit is compatible with the apparatus;
compare the restored attribute information to the attribute information; and
display an anomaly if the restored attribute information does not match the attribute information.

10. The apparatus according to claim 9,
wherein the processor is further configured to:
determine whether a mounted position of the detachable unit is appropriate, based on the attribute information; and
decode the authentication information using the public key to obtain the restored attribute information if the processor determines that the mounted position of the detachable unit is appropriate.

* * * * *